United States Patent [19]

Shapler

[11] Patent Number: 4,802,832

[45] Date of Patent: Feb. 7, 1989

[54] IN-MOLD LABELING ACCESSORY FOR A BLOW MOLDING MACHINE

[75] Inventor: Thomas A. Shapler, Bowling Green, Ohio

[73] Assignee: Hoover Universal, Inc., Ann Arbor, Mich.

[21] Appl. No.: 112,263

[22] Filed: Oct. 22, 1987

[51] Int. Cl.$^4$ ............................................. B29C 49/24
[52] U.S. Cl. .................................. 425/126.1; 264/509; 425/503; 425/504; 425/532; 425/539
[58] Field of Search .......... 264/509; 271/31.1, 105.98, 271/106, 107; 425/126.1, 503, 504, 522, 532, 539

[56] References Cited

U.S. PATENT DOCUMENTS

| | | | |
|---|---|---|---|
| 3,837,639 | 9/1974 | Phillips | 271/105 |
| 3,977,670 | 8/1976 | Tsuruta et al. | 271/105 |
| 4,549,863 | 10/1985 | Bourgeois | 425/126 R |
| 4,637,600 | 1/1987 | Bartimes et al. | 264/509 |
| 4,679,997 | 7/1987 | Plenzler et al. | 264/509 |

Primary Examiner—Jay H. Woo
Assistant Examiner—Timothy W. Heitbrink
Attorney, Agent, or Firm—Harness, Dickey & Pierce

[57] ABSTRACT

An in-mold labeling device for blow molding machines which includes a carriage assembly which moves a labeling head between a position in registry with a label storage magazine to a displaced position in registry with a cavities of molds. The labeling head includes a pick-up arm which is pivotable and supports a self aligning pick-up pad which carries one or more vacuum cups. In operation, the carriage assembly moves to a first position where the pick-up arm is pivoted to place the vacuum cups in contact with a label carried by the storage magazine. The pick-up arm is then pivoted back to pull off a label, and a slide is moved to position the labeling head into registering with an open mold. The pick-up arm is again pivoted to deposit the label in position onto the inside surface of the mold cavity and is maintained in that position through vacuum ports within the mold. Vacuum signals to the vacuum cups are relieved and the pick-up arm and the slide member are returned to their initial position to engage another label.

12 Claims, 6 Drawing Sheets

IN-MOLD LABELING ACCESSORY FOR A BLOW MOLDING MACHINE

BACKGROUND OF THE INVENTION

This invention relates to an accessory for blow molding machines and particularly to one for transferring container labels from a storage magazine to an article forming mold cavity such that the labels become molded into the final product.

Blow molding machines are used to produce various articles such as containers for household chemicals and other substances. In typical blow molding processes, a pair of old halves are clamped together around a tubular molten parison of thermoplastic material which is inflated by gas pressure to conform to the old cavity. Frequently, labels for product identification, instructions, warnings, etc., must be applied to the containers. In the past, containers were sent to a separate work station where labels were adhesively bonded to the container. More recently, however, a class of blow molding machines has been developed having in-mold labeling capability. For these machines, labels are transferred from a storage magazine and deposited directly into the molds prior to forming the article. Vacuum ports within the molds maintain the labels in position as they are clamped around the molten parison of thermoplastic material. When the parison is inflated, the labels become thermally bonded to the container outer surface. This process of in-mold labeling provides a label which is quite durable, less likely to peel off the container, and is more aesthetically desirable since it is molded flush with the container surface.

Numerous methods are presently employed in carrying out in-mold labeling processes. In accordance with this invention, an in-mold labeling accessory for blow molding machines is provided featuring improvements in the manner in which labels are located, and in reliability of loading labels into the molds.

SUMMARY OF THE INVENTION

In accordance with this invention, an in-mold labeling accessory is provided having an upper carriage which moves one or more label pick-up arms between a label magazine station and in position in registry with the open mold cavities. The pick-up arm pivots about one of its ends such that a pair of vacuum cups on an articulating vacuum head carried by the other end of the arm are positioned to contact a label in the label magazine. The arm is then retracted and the assembly is moved to place the vacuum head in registry with the open mold cavities. The pick-up arm is again extended causing the vacuum cups to place the label against the internal surface of the open mold cavity. Vacuum is relieved from the vacuum cups and is applied to ports on the mold surface so that the pick-up arm may return to its original position in registry with the label storage magazine while leaving a label in the desired position inside the mold. Platens which support the mold halves cause them to clamp together around a molten plastic parison which is then inflated, thus forming the container and fusing the label to the container outer surface.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a pictorial view of a dual parison continuous blow molding machine in accordance with a prior art design of a type which this invention is adapted for use with.

DETAILED DESCRIPTION OF THE INVENTION

Figure 1:
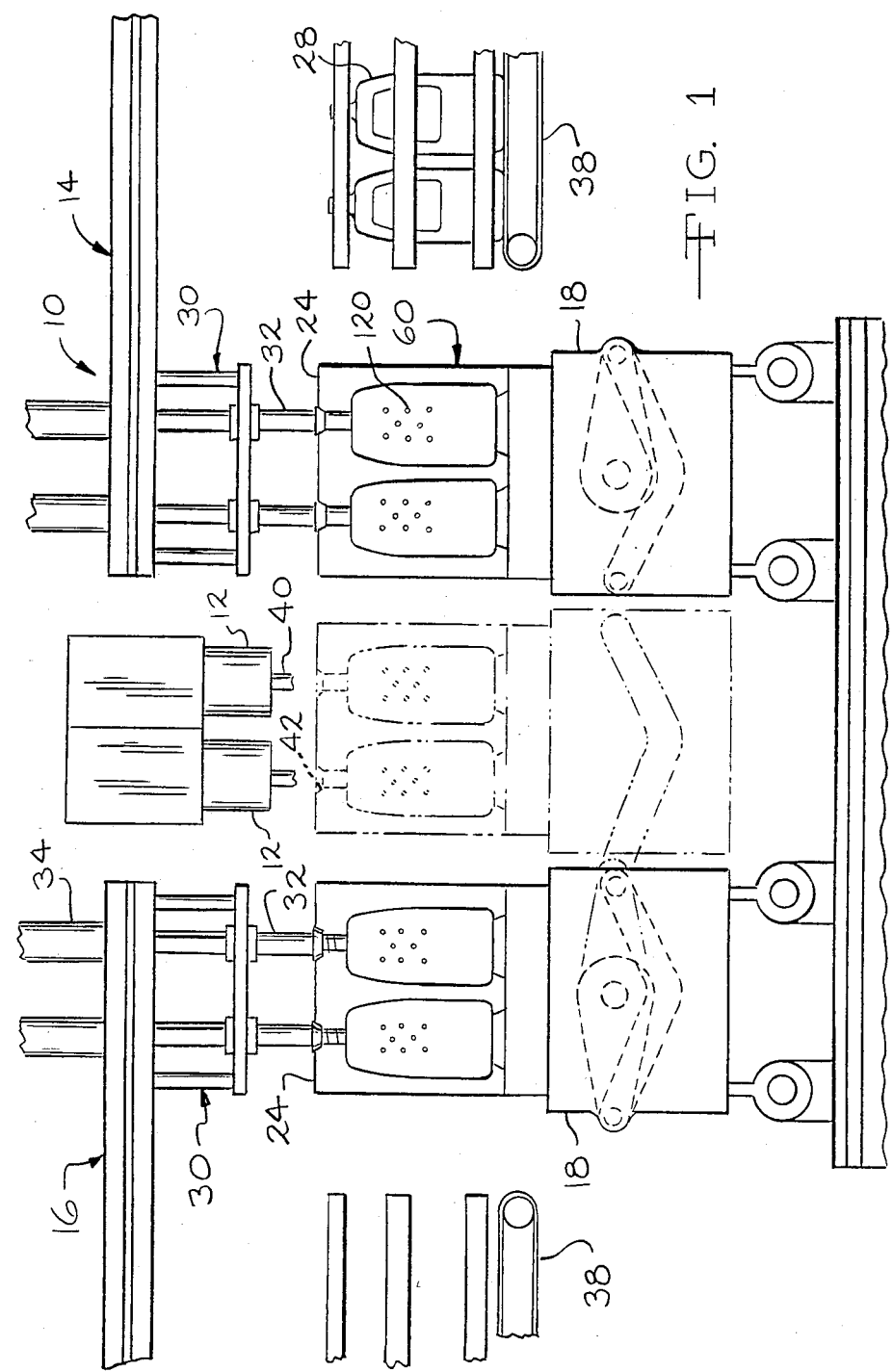

FIG. 1 illustrates a conventional dual parison type continuous blow molding machine of the type which the present invention may be used with, which is generally designated by reference number 10. Centrally located in FIG. 1 is a pair of extruder heads 12 which each emit a continuous stream of molten thermoplastic material, referred to in the art as parisons. Laterally disposed on each side of extruder heads 12 are blow stations 14 and 16 which are identical and symmetrical with respect to the extruder heads but operate out of phase, as explained below. Each of blow stations 14 and 16 include a lower carriage 18 which are both laterally movable between the full line positions shown in FIG. 1 to the central position beneath extruder heads 12, shown in phantom lines. Carriages 18 also each carry a platen which provides a mounting structure for a pair of mold halves 24 and 26 which form mold cavity 27. Mold halves 24 and 26 can be configured to form an almost endless variety of objects, but are shown as forming containers 28 which can be used for various uses such as for storing household chemicals, etc. Platen 22 includes means for moving mold halves 24 and 26 between the separated position shown in FIG. 3 to a clamped together position. Blow stations 14 and 16 further include blow pin assemblies 30, each having a pair of blow pins 32 which are axially movable by blow cylinders 34.

Molding machine 10 further include transport mechanisms (not shown) coupled to mold halves 24 and 26 which remove completed containers 28 from blow pin assemblies 30 and deposits them onto conveyor 38 where they are transported to subsequent work stations, or storage bins, etc.

During operation of blow molding machine 10, one of the carriages 18 of blow stations 14 or 16 is positioned in the phantom line area of FIG. 1 beneath extruder heads 12. In that position, mold halves 24 and 26 are separated, thus exposing mold cavity 27. A pair of parisons 40 (shown partially in FIGS. 1 and 2) hang from extruder heads 12, and when they have developed a sufficient length, platen 22 causes old halves 24 and 26 to 32 clamped around the parisons, thus trapping the parisons within mold cavity 27. A parison cutter knife (not shown) is used to separate the parisons 40 entrapped within the mold halves from the continuous flow of molten material being discharged from extruder heads 12. After cutting of the parison, carriage 18 moves away from the center position to one of the full line positions shown in FIG. 1 (depending on which of molding stations 14 or 16 that the carriage is associated with). At this point, blow cylinders 34 cause blow pins 32 to extend into the upper orifice 42 formed by mold halves 24 and 26 which form the neck of container 28. Air is emitted from blow pins 32 to cause the molten parisons 40 to expand until they conform to the configuration of mold cavities 27. A short dwell period enables the thermoplastic material forming parisons 40 to freeze in the configuration of container 28. Mold halves 24 and 26 are then separated, leaving containers 28 hanging from blow pins 32 where they are refined and loaded onto conveyors 38.

Each of blow stations 14 and 16 are synchronized so that, while blow pins 32 are inserted into one of the sets of mold halves 24 and 26, the other set of mold halves are positioned to capture the parisons being emitted from extruder heads 12. In this manner, extruder heads 12 may be operated to continuously discharge a stream of parison material which provides processing benefits as compared to machines which use an extruder which cyclically discharges parisons.

Figure 2:
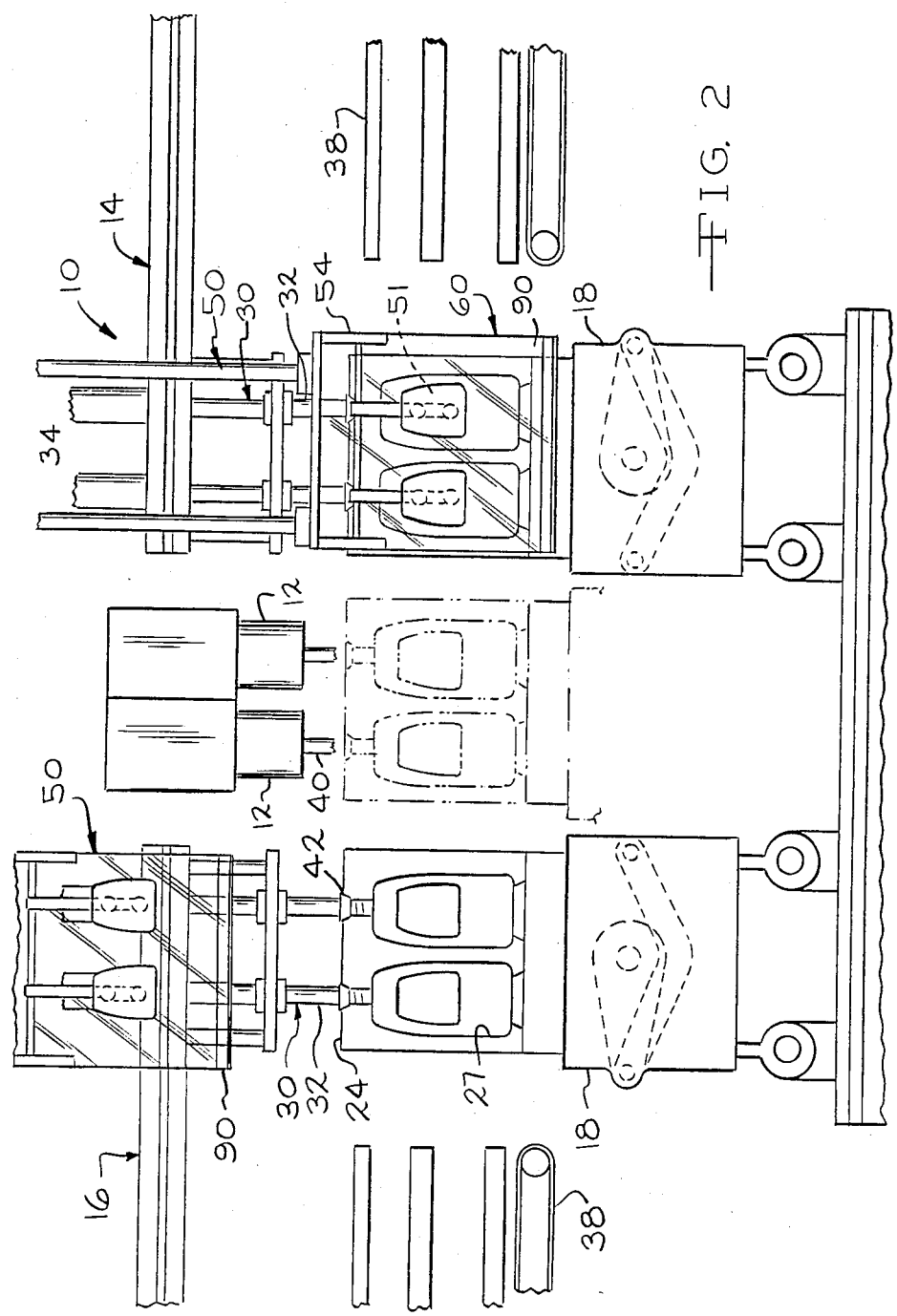
FIG. 2 is a side elevational view of the dual parison continuous blow molding machine as shown in FIG. 1, also showing two in-mold labeling accessories in accordance with this invention shown in various operational cycle stages.
Figure 3:
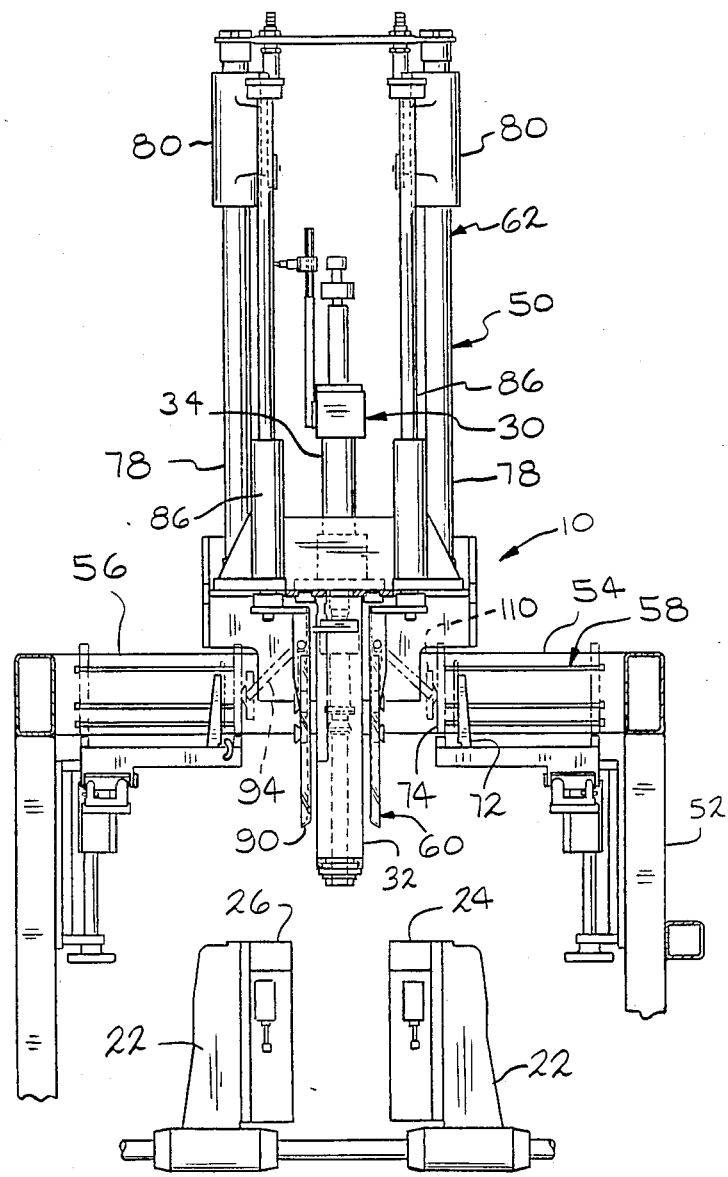
FIG. 3 is a side view of the in-mold labeling accessory according to this invention, shown with a blow pin, blow molding molds and movable platens, and showing the in-mold labeling head in a retracted position in registry with the label magazine.
Figure 4:
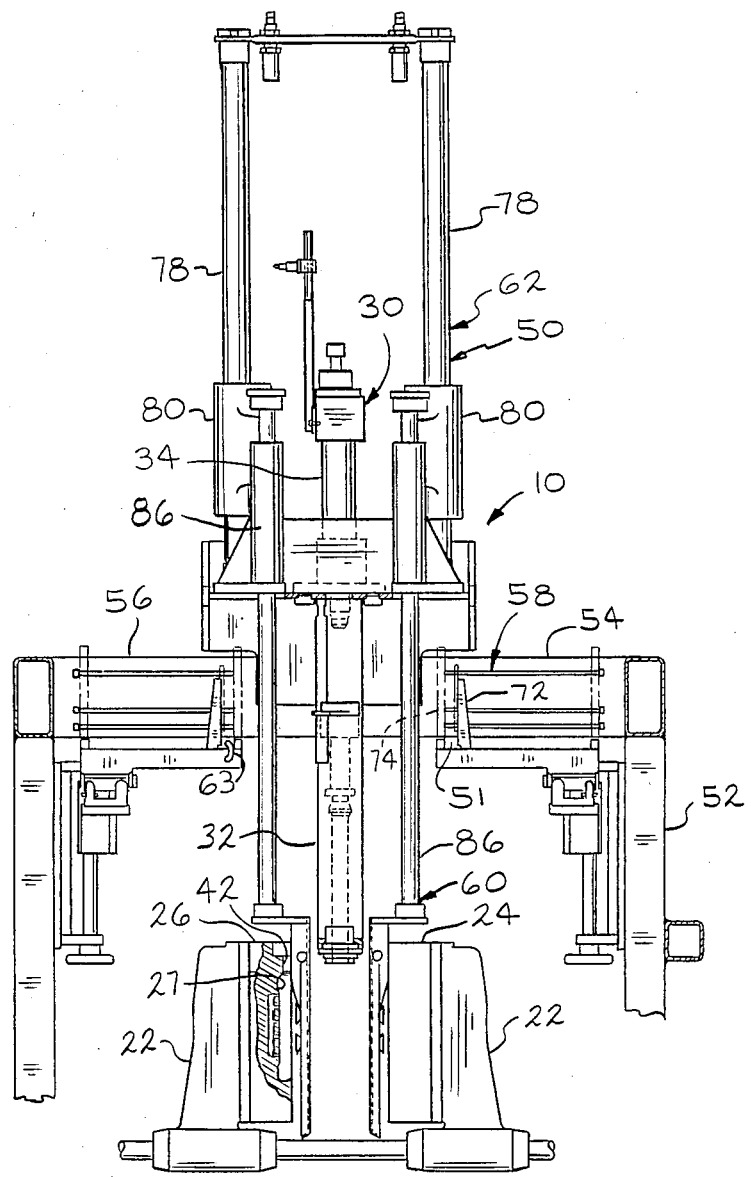
FIG. 4 is a side elevational view similar to FIG. 3 but showing the in-mold labeling head in an extended position in registry with the mold cavity.

FIG. 2 illustrates blow molding machine 10 incorporating a pair of in-mold labeling accessories in accordance with the present invention which are generally designated by reference number 50. Accessories 50 are used to deposit labels 51 within mold cavities 27 before mold halves 24 and 26 clamp around the parisons such that the labels become thermally bonded to the thermoplastic material making up containers 28 during the blowing step. In-mold labeling accessories 50 are mounted to stationary support structure 52 as shown in FIGS. 3 and 4 and are positioned laterally from extruder heads 12, as shown in Figure. Labeling accessories 50 described herein are adapted for placing a pair of labels 51, i.e., front and rear labels onto containers 28. Accessories 50 include front and rear subassemblies 54 and 56, each for loading one label. Since subassemblies 54 and 56 are identical, only front subassembly 54 will be described hereinafter in detail. For applications where only a single label is loaded into one of mold halves 24 or 26, it would be necessary to employ only one of the two subassemblies 54 or 56.

labeling accessory 50 principally comprises label magazine 58, labeling head 60, and upper carriage assembly 62. Label magazine 58 stores a large number of individual labels 51 which are stacked in a horizontal row. Fence 72 is movable to push the stack of labels 51 against one end of magazine 58. A constant force spring (not shown) is used which acts on fence 72 to exert a uniform force on the stack of labels 51, irrespective of the number of labels being retained. The individual label 51 positioned at the end of the stack opposite fence 72 is held in position by plate 74 which engages the label at its perimeter. In order to reduce adhesion between the label 51 at the end of the stack and the remaining labels, a jet of air through tube 63 is directed at the side of the stack, thus developing an air layer between the labels.

Upper carriage assembly 62 includes slides 80 which move along a pair of rodless type actuation cylinders 78. Cylinders 78 have an internal piston (not shown) driven by air pressure which is magnetically coupled to slides 80. Slides 80 are coupled to rods 86 and cause labelling head 60 to move from the upper position shown in FIG. 3 to the downwardly projected position illustrated by FIG. 4. Movement of rods 86 is guided by bushings 88.

Figure 5:
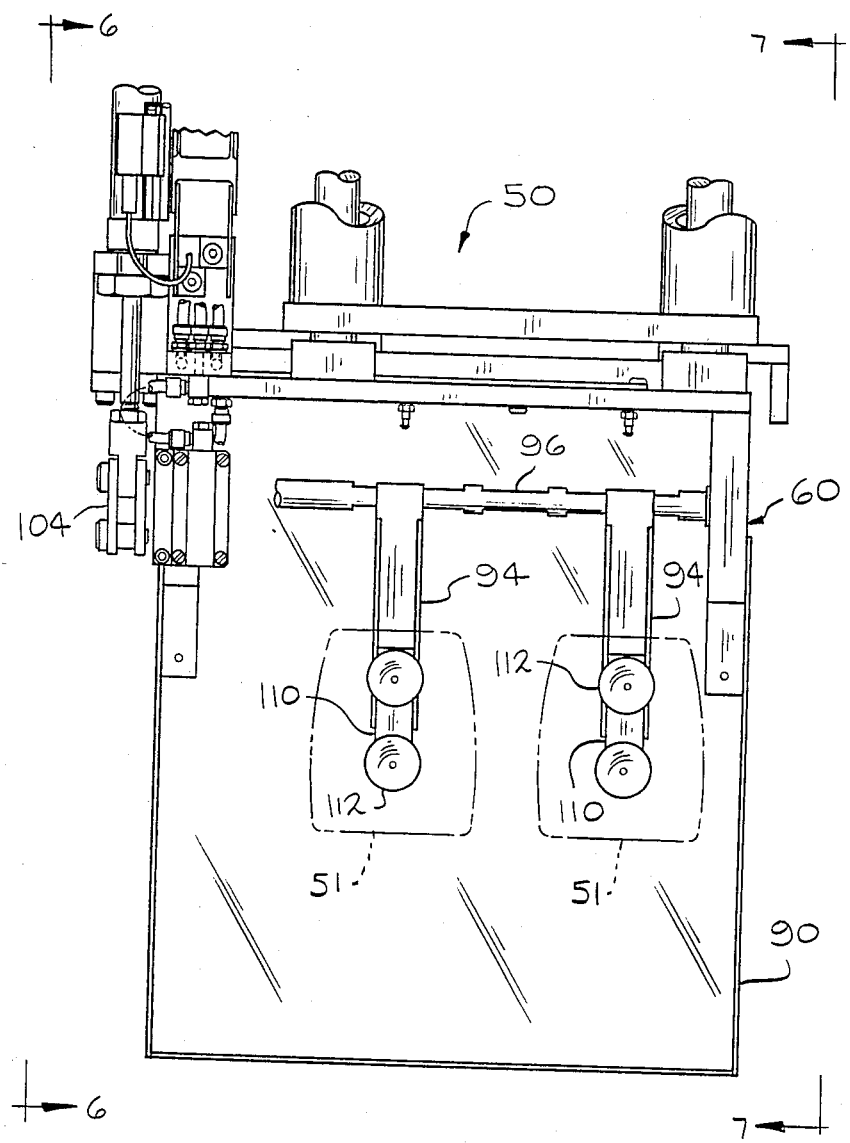
FIG. 5 is a side elevational view of the pick-up head of the in-mold labeling accessory according to this invention.
Figures 6, 7:
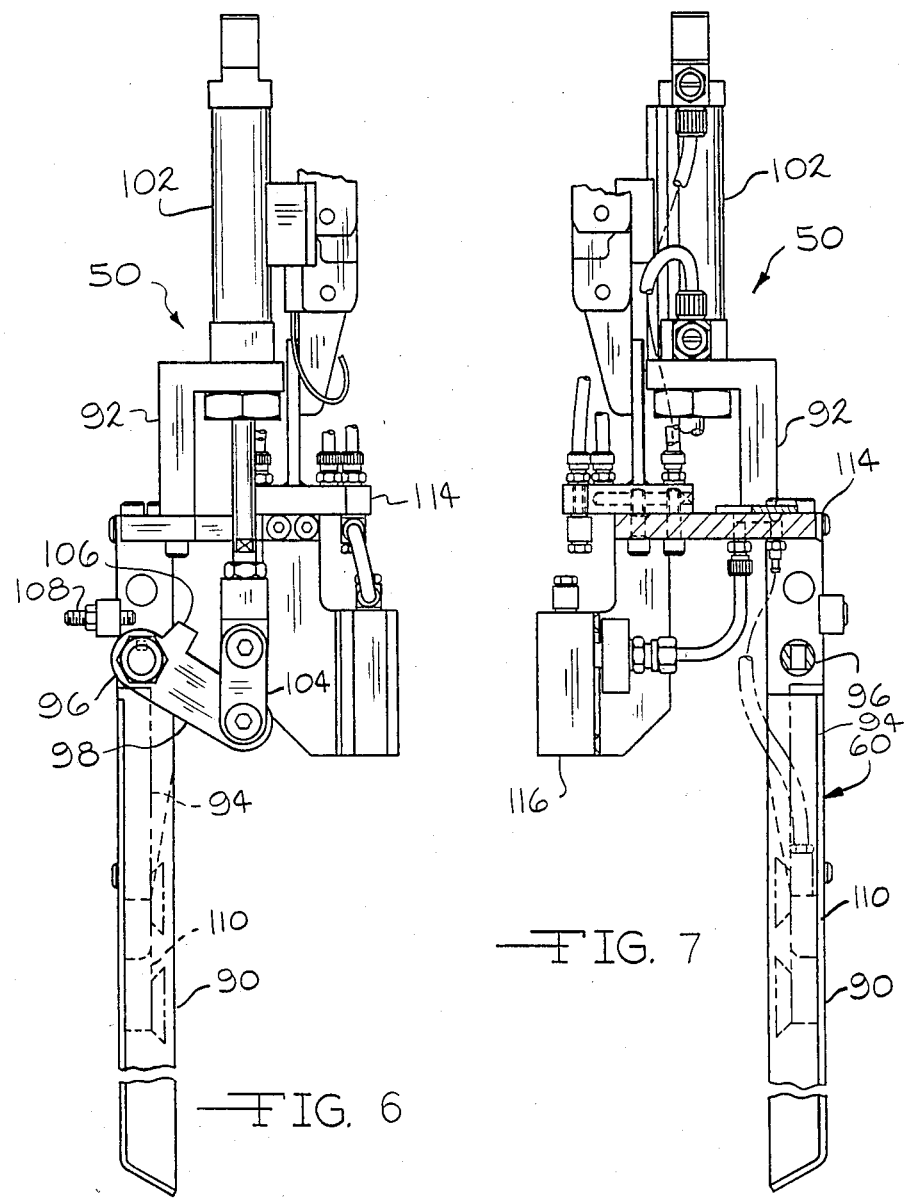
FIG. 6 is a front view of the pick-up head shown in FIG. 5.
FIG. 7 is a rear view of the pick-up head shown in FIG. 5.

The details of labeling head 60 are best shown with reference to FIGS. 5 through 7. Shield 90 protects labels 51 and is held in position by bracket 92. Pick-up arms 94 are attached to and rotate with shaft 96 from the generally vertical position against shield 90 as shown in FIGS. 6 and 7, to the extended position shown in phantom lines in FIG. 3. Actuation of pick-up arms 94 occurs through movement of crank 98 which is coupled to labeling cylinder 102 through link 104. Lug 106 extending from crank 98 engages stop shaft 108 to establish the extreme range of angular motion of arm 94 from the vertical position. Vacuum heads 110 are pivotably connected to the distal ends of pick-up arms 94 and are freely rotatable thereabout within a limited angular range. A pair of vacuum cups 112 are carried by each of vacuum heads 110. A vacuum signal is applied to vacuum cups 112 through ports within manifold 114 which communicate with a venturi type vacuum pump 116. Manifold 114 also provides passages and conduit connections for control signals to labeling cylinder 102 to cause the cylinder to extend and retract.

Operation of in-mold labeling accessory 50 will now be explained with reference to the above described configuration of the elements. As previously described in connection with FIG. 1, mold halves 24 and 26 are separated after the thermoplastic material making up parisons 40 has frozen in the configuration of the final product, which for the embodiment shown is a container 28. It is at this point in the operational sequence of machine 10 that in-mold labeling accessory 50 deposits labels 51 into mold halves 24 and 26. Labels 51 are first picked off the stacks of labels in labeling magazine 50 while slide 80 is in the retracted position as shown in FIG. 3. In that position, labeling cylinder 102 is retracted which causes pick-up arms 94 to rotate outwardly so that vacuum heads 110 and vacuum cups 112 are positioned to engage the first of the labels in the stack. Since heads 110 are pivotable with respect to arms 94, vacuum cups 112 are permitted to self-align to properly engage the labels 51. This self-aligning behavior is provided due to the pivoting of head 110 and the location of the pivot connection of arm 94 to the head, which is between vacuum cups 112. A vacuum signal is applied by vacuum pump 116 so that a single label 51 adheres to vacuum cups 112. Labelling cylinder 102 is then retracted so that label 51 is brought into the position adjacent shield 90. The self-aligning movement of head 110 enables it to fit flat against shield 90. Labeler actuation cylinder 80 is then actuated such that labeling head 60 drops to its lowermost position, which is depicted by FIG. 4. Shields 90 protect the labels from coming into contact with the warm plastic container 28 still connected to blow pin 32.

Once labeling head 60 is dropped to the position shown in FIG. 4, labeling cylinder 102 is again retracted which causes labels 51 to move to their final position against the surfaces of mold cavity 27. Vacuum ports 120 which are located on the surface of mold cavity 27 cause the labels to be maintained in the desired position. Once labels 51 are deposited in the mold, the vacuum signal to cups 112 is relieved and labeling cylinder 102 is extended. Labeling head 60 is thereafter retracted so that the label loading cycle can be repeated cyclically.

While the above description constitutes the preferred embodiments of the present invention, it will be appreciated that the invention is susceptible to modification, variation ad change without departing from the proper scope and fair meaning of the accompanying claims.

What is claimed is:

1. An accessory for a continuous blow molding machine of the type having an elongated blow pin insertable within a parison for forming articles wherein said accessory places labels into a mold cavity such that the labels become bonded to the article during molding, said accessory comprising:

a label magazine positioned above said mold cavity for storing a plurality of said labels, a carriage assembly having a vertically movable portion slidably mounted above said mold cavity, a pick-up head coupled to said vertically movable portion, said pick-up head having at least one pick-up arm pivotable between an extended and a retracted position, said pick-up head further having a vacuum head carried by an end of said arm and pivotable with respect to said arm, said vacuum head carrying at least one vacuum cup, first actuation means for translating said movable portion along the side of said blow pin between a first position in which said vacuum cup is in registry with said label magazine, to a second position wherein said vacuum cup is in registry with the mold cavity, and second actuation means for pivoting said pick-up arm from said retracted position to said extended position wherein, when said carriage movable portion is at said first position, said pick-up arm is pivotable to said extended position causing said vacuum cup to engage the label from said magazine and said pick-up arm being further pivotable to said retracted position and thereafter said carriage movable portion is retracted and thereafter said carriage movable portion is movable to said second position whereat said pick-up arm is again pivoted to said first position to deposit the label into said mold cavity, and said movable portion is therefore movable to said first position to again position said vacuum cup in registry with said magazine shield means for protecting said label and for aligning said pick-up head to a predetermined orientation when said actuation means is in said retracted position.

2. An accessory for a blow molding machine of claim 1 wherein said vacuum head carries two vacuum cups.

3. An accessory for a blow molding machine of claim 2 wherein the positioning of an axis of pivoting of said vacuum head with respect to said pick-up arm enables said vacuum head to self-align when said vacuum cup engages the label from said magazine and when said label is loaded into the mold cavity.

4. An accessory for a blow molding machine of claim 1 further comprising adjustable means for limiting the degree of pivoting of said pick-up arm.

5. An accessory for a blow molding machine of claim 1 wherein a pair of said accessories are provided for placing labels into each of a pair of mold halves.

6. An accessory for a blow molding machine of claim 1 wherein said magazine includes passage means for directing a jet of air against said labels thereby reducing adhesion between the label positioned to be engaged by said pick-up head and the remaining labels retained by said label magazine.

7. An accessory for a continuous blow molding machine of the type having a pair of mold halves defining a mold cavity wherein said mold halves are clamped around a parison of molten thermoplastic material, and moved to a laterally displaced blow station where a blow pin inflates said parison whereat said mold halves are separated to release an article conforming to said mold cavity and are thereafter returned to clamp around an additional parison, said accessory placing a label into the mold cavity such that the label becomes bonded to the article, said accessory comprising:

a label magazine above said mold cavity for storing a plurality of said labels, a carriage positioned in registry with said blow station and having a vertically movable slide, a pick-up head coupled to said slide and positioned adjacent said blow pin, said pick-up head having at least one pick-up arm pivotable between a retracted and an extended position, said pick-up head further having a vacuum head carrying at least a pair of vacuum cups, said vacuum head pinned for pivotable motion about an axis positioned between said cups, first actuation means for moving said slide vertically along side said blow pin between a first position in which said vacuum cups are in registry with said label magazine, to a second position wherein said vacuum cups are in registry with the mold cavity, and a second actuation means for pivoting said pick-up arm from said retracted position to said extended position wherein, when said slide is at said first position, said pick-up arm is pivotable to said extended positioned causing said vacuum cups to engage the label from said magazine and further pivotable to said retracted position and thereafter said slide is movable to said second position whereat said pick-up arm is again pivoted to said extended position to deposit the label into said mold cavity, and said slide is therefore movable to said first position to again position said vacuum cups in registry with said magazine shield means for protecting said label and for aligning said pick-up head to a predetermined orientation when said actuation means is in said retracted position.

8. An accessory for a continuous blow molding machine of claim 7 wherein the positioning of said axis of pivotable motion of said vacuum head enables said vacuum head to self align when said vacuum cups engage the label from said magazine and when said label is loaded into the mold cavity.

9. An accessory for a continuous blow molding machine of claim 7 further comprising adjustable means for limiting the degree of pivoting of said pick-up arm.

10. An accessory for a continuous blow molding machine of claim 7 wherein a pair of said accessories are provided for placing labels into each of a pair of mold halves.

11. An accessory for a blow molding machine of claim 7 wherein said magazine includes passage means for directing a jet of air against said labels thereby reducing adhesion between the label positioned to be engaged by said pick-up head and the remaining labels retained by said label magazine.

12. An accessory for a blow molding machine for forming articles which places labels into a mold cavity such that the labels become bonded to the article during molding, said accessory comprising:

a label magazine for storing a plurality of said labels, a carriage assembly having a movable portion, a pick-up head coupled to said movable portion, said pick-up head having at least one pick-up arm pivotable between an extended and a retracted position, said pick-up head further having a vacuum head carried by an end of said arm and pivotable with respect to said arm, said vacuum head carrying at least one vacuum cup, first actuation means for translating said movable portion between a first position in which said vacuum cup is in registry with said label magazine, to a second position wherein said vacuum cup is in registry with the mold cavity, and second actuation means for pivoting said pick-up from said retracted position to said extended position wherein, when said carriage movable portion is at said first position, said pick-up arm is pivotable to said extended position causing said vacuum cup to engage the label from said magazine and said pick-up arm being further pivotable to said retracted position and thereafter said carriage movable portion is movable to said second position whereat said pick-up arm is again pivoted to said first position to deposit the label into said mold cavity and said movable portion is therefore movable to said first position to again position said vacuum cup in registry with said magazine, said pick-up head further comprising a shield which protects the label carried by said vacuum cup from said article connected to a blow pin.

* * * * *

UNITED STATES PATENT AND TRADEMARK OFFICE
CERTIFICATE OF CORRECTION

PATENT NO. : 4,802,832

DATED : February 7, 1989

INVENTOR(S) : Thomas A. Shapler

It is certified that error appears in the above-identified patent and that said Letters Patent is hereby corrected as shown below:

In the Abstract, line 5, before "cavities", delete "a" and insert --the--.

Column 1, line 15, "old" should be --mold--.

Column 1, line 17, "old" should be --mold--.

Column 3, line 3, "old" should be --mold--.

Column 3, line 4, "32" should be --be--.

Column 3, line 22, "refined" should be --removed--.

Column 3, line 44, after "Figure" insert --2--.

Signed and Sealed this

Twenty-third Day of January, 1990

*Attest:*

JEFFREY M. SAMUELS

*Attesting Officer*     *Acting Commissioner of Patents and Trademarks*